United States Patent
Kim et al.

(10) Patent No.: US 8,373,388 B2
(45) Date of Patent: Feb. 12, 2013

(54) PORTABLE DEVICE AND BATTERY CHARGING METHOD THEREOF

(75) Inventors: Yong Hae Kim, Daejeon (KR); Seung Youl Kang, Daejeon (KR); Myung Lae Lee, Daejeon (KR); Jong Moo Lee, Daejeon (KR); Sang Hoon Cheon, Daejeon (KR); Tae Hyoung Zyung, Dajeon (KR); Yeon Seok Jeong, Seoul (KR)

(73) Assignee: Electronics and Telecommunications Research Institute, Daejeon (KR)

(*) Notice: Subject to any disclaimer, the term of this patent is extended or adjusted under 35 U.S.C. 154(b) by 345 days.

(21) Appl. No.: 12/873,017

(22) Filed: Aug. 31, 2010

(65) Prior Publication Data

US 2011/0140671 A1 Jun. 16, 2011

(30) Foreign Application Priority Data

Dec. 11, 2009 (KR) .................. 10-2009-0123456
Mar. 31, 2010 (KR) .................. 10-2010-0029239

(51) Int. Cl.
*H01J 7/00* (2006.01)
*H04B 1/16* (2006.01)
*H01F 27/42* (2006.01)

(52) U.S. Cl. ........ 320/108; 320/107; 320/110; 320/114; 320/125; 320/137; 455/151.2; 307/104

(58) Field of Classification Search .................. 320/108
See application file for complete search history.

(56) References Cited

U.S. PATENT DOCUMENTS

| | | | |
|---|---|---|---|
| 5,455,499 A * | 10/1995 | Uskali et al. | 340/636.1 |
| 5,870,685 A * | 2/1999 | Flynn | 455/573 |
| 6,429,622 B1 * | 8/2002 | Svensson | 320/106 |
| 6,522,361 B2 * | 2/2003 | Higuchi et al. | 348/372 |
| 6,522,902 B2 * | 2/2003 | Nishihara et al. | 455/574 |
| 6,906,495 B2 | 6/2005 | Cheng et al. | |
| 7,633,263 B2 | 12/2009 | Toya | |
| 2003/0114206 A1 * | 6/2003 | Timothy et al. | 455/575 |
| 2005/0099156 A1 * | 5/2005 | Brenner | 320/116 |
| 2005/0170827 A1 * | 8/2005 | Nagashima | 455/419 |
| 2007/0042813 A1 * | 2/2007 | Ito | 455/573 |
| 2008/0303479 A1 * | 12/2008 | Park et al. | 320/108 |

FOREIGN PATENT DOCUMENTS

| | | |
|---|---|---|
| KR | 10-0361755 | 11/2002 |
| KR | 2008-0005020 | 1/2008 |
| KR | 10-2010-0005698 | 1/2010 |
| WO | WO-03/105308 A1 | 12/2003 |

OTHER PUBLICATIONS

Kurs et al., "Wireless Power Transfer via Strongly Coupled Magnetic Resonances", Science, vol. 317. No. 5834, pp. 83-86 (Jul. 6, 2007).

* cited by examiner

*Primary Examiner* — Yalkew Fantu
(74) *Attorney, Agent, or Firm* — Rabin & Berdo, P.C.

(57) ABSTRACT

Provided is a portable device. The portable device includes a near distance antenna, a long distance antenna, a first power generation circuit, a second power generation circuit, and a battery. The near distance antenna receives a first power source signal in an electromagnetic inductive coupling scheme. The long distance antenna receives a second power source signal in a magnetic resonance scheme. The first power generation circuit generates a power source from the first power source signal. The second power generation circuit generates a power source from the second power source signal. The battery is charged with the generated power source.

19 Claims, 6 Drawing Sheets

PORTABLE DEVICE AND BATTERY CHARGING METHOD THEREOF

CROSS-REFERENCE TO RELATED APPLICATIONS

This U.S. non-provisional patent application claims priority under 35 U.S.C. §119 of Korean Patent Application Nos. 10-2009-0123456, filed on Dec. 11, 2009, and 10-2010-0029239, filed on Mar. 31, 2010, the entire contents of which are hereby incorporated by reference.

BACKGROUND OF THE INVENTION

The present invention disclosed herein relates to a portable device, and more particularly, to a portable device and a battery charging method thereof, which charge a battery through an antenna.

Portable devices may be carried by users and thus be conveniently used at any place. Such portable devices, for example, include portable phones, smart phones, Personal Digital Assistants (PDAs), Portable Media Players (PMPs), Digital Audio Players (DAPS), notebook computers, net book computers, camcorders and e-books. A battery for supplying a power source is built into or attached to the portable devices.

Batteries have a certain capacity, and the charge of the batteries may be performed within a predetermined capacity. When the charged power of a battery is depleted, a portable device with the battery may not normally operate.

Accordingly, there is a contact point scheme, as one of schemes for charging the batteries of the portable devices. The contact point scheme contacts the positive/negative ports of a battery and the positive/negative ports of a charger therebetween to charge the battery. However, when foreign materials exist in a port or the port has been corroded, the contact point scheme may not normally charge a battery.

SUMMARY OF THE INVENTION

The present invention provides a portable device and a battery charging method thereof, which charge a battery in a noncontact point scheme.

The present invention also provides a portable device and a battery charging method thereof, which charge a battery through an antenna irrespective of a distance separated from a charger.

Embodiments of the present invention provide a portable device including: a near distance antenna receiving a first power source signal in an electromagnetic inductive coupling scheme; a long distance antenna receiving a second power source signal in a magnetic resonance scheme; a first power generation circuit generating a power source from the first power source signal; a second power generation circuit generating a power source from the second power source signal; and a battery charged with the generated power source.

In some embodiments, the near distance antenna and the long distance antenna may be internal antennas, respectively.

In other embodiments, the near distance antenna may include a first repeater coil having a winding direction parallel to a surface of the portable device.

In still other embodiments, the near distance antenna may further include a second repeater coil which is perpendicularly crossed with the first repeater coil.

In even other embodiments, the long distance antenna may include a loop antenna.

In yet other embodiments, the first and second power source signals may use frequencies having different bands, respectively.

In further embodiments, the first power generation circuit may include: a first rectifier changing the first power source signal into an Direct Current (DC) power source; a first voltage controller removing a ripple which is included in the power source; and a first protector generating a first charge state control signal which represents a charged state of the battery, and providing the power source, from which the ripple is removed, to the battery in response to a first charge enable signal.

In still further embodiments, the second power generation circuit may include: a clock generator generating a clock signal from the second power source signal; a second rectifier changing the second power source signal into a Direct Current (DC) power source; a second voltage controller removing a ripple which is included in the power source; a second protector generating a second charge state control signal which represents a charged state of the battery, and providing the power source, from which the ripple is removed, to the battery in response to a second charge enable signal; and a voltage/frequency converter generating a frequency signal from the power source signal.

In even further embodiments, the portable device may further include a signal generating circuit generating the first charge enable signal on the basis of the first charge state signal, and generating the second charge enable signal on the basis of the second charge state signal.

In yet further embodiments, the signal generation circuit may include: a charge controller generating the first charge enable signal and the second charge enable signal, receiving the clock signal, and generating an authentication message for obtaining authentication of the portable device from the charger; an encoder encoding the authentication message; and a modulator modulating the encoded authentication message to be in correspondence with the frequency signal, and transmitting the modulated message through the long distance antenna.

In much further embodiments, the authentication message may include identification (ID) information of the portable device.

In other embodiments of the present invention, a battery charging method of portable device includes: receiving a power source signal through at least one antenna of a near distance antenna and a long distance antenna according to a separated distance from a charger; changing the power source signal into an Direct Current (DC) power source; removing a ripple of the AC-converted power source; and providing the power source, from which the ripple is removed, to a battery based on a charged state of the battery, wherein the near distance antenna uses an electromagnetic inductive coupling scheme, and the long distance antenna uses a magnetic resonance scheme.

In some embodiments, the receiving of a power source signal may receive a power source signal through the near distance antenna which includes at least one or more repeater coils having a winding direction parallel to a surface of the portable device.

In other embodiments, a first repeater coil of the repeater coils may be perpendicularly crossed with a second repeater coil of the repeater coils.

In still other embodiments, the receiving of a power source signal may receive a power source signal through the long distance antenna which includes a loop coil.

In even other embodiments, the battery charging method may further include transmitting an authentication message for authentication of the portable device.

In yet other embodiments, the authentication message may be modulated into a frequency which is obtained from the second power source signal and transmitted.

In further embodiments, the battery charging method may further include transmitting a charge-requesting message for requesting supply of at least one of the first and second power source signals to the charger, based on a charged state of the battery.

In still further embodiments, the charge-requesting message may be modulated into a frequency which is obtained from the second power source signal and transmitted.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. In the following description, only elements necessary for understanding operations according to embodiments of the inventive concept will be described, and the description of other elements will be omitted in order not to unnecessarily obscure subject matters of the inventive concept.

Embodiments of the present invention provide a portable device and a battery charging method thereof, which charge a battery power in a noncontact point scheme. It is assumed that the portable device according to embodiments of the present invention uses an antenna for charging a battery in a noncontact point scheme.

Figure 1:
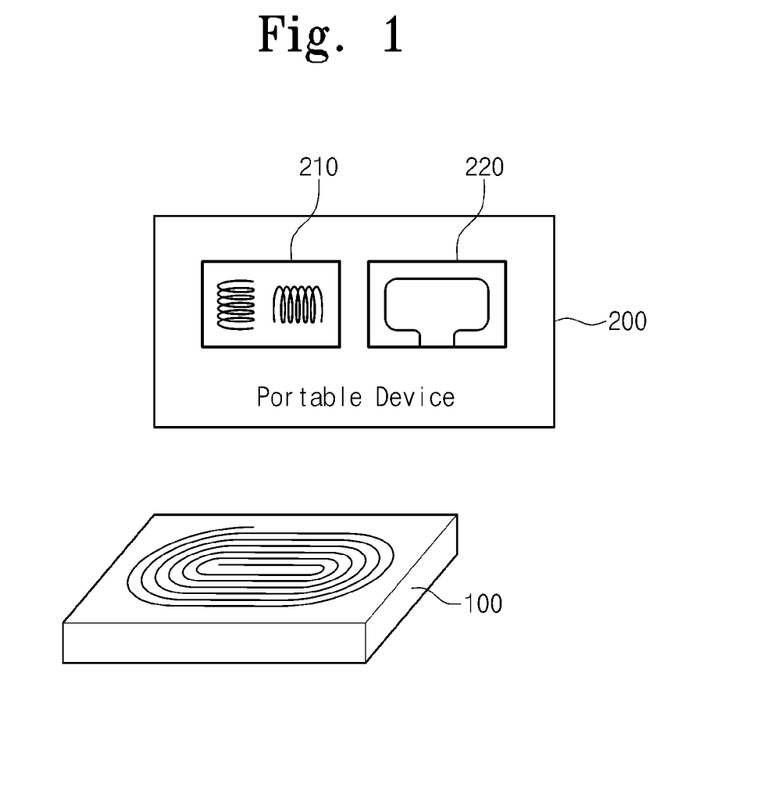
FIG. 1 is a diagram illustrating a portable device charging system according to an embodiment of the present invention.

FIG. 1 is a diagram illustrating a portable device charging system according to an embodiment of the present invention.

Referring to FIG. 1, a portable device charging system according to an embodiment of the present invention includes a charger 100 and a portable device 200.

The charger 100 generates a power source signal for the charge of the portable device 200. The charger 100 generates a power source signal for charging a battery of the portable device 200. The charger 100 may charge the battery of the portable device 100 with a power source signal in a noncontact point scheme. The charger 100 includes a charge coil for the generating of the power source signal.

The portable device 200 is a user device, and operates with an operation power source that is supplied from the battery. The portable device 200 may include the battery for supplying the operation power source, or the battery may be attached to the portable device 200. The portable device 200 may charge the battery with the power source signal that is received from the charger 100.

In an embodiment of the present invention, the portable device 200 may include at least two antennas 210 and 220 for receiving the power source signal. The portable device 200 may receive the power source signal from each of the antennas 210 and 220 in different schemes, in consideration of a distance separated from the charger 100.

The portable device 200, which is disposed at a position near to the charger 100, for example, the surface of the charger coil, may use the first antenna 210. The first antenna 210 receives the power source signal through an electromagnetic inductive coupling scheme. Herein, the electromagnetic inductive coupling scheme is one that charges a battery with a power source signal which is generated between adjacent coils. The first antenna 210 includes a repeater coil for receiving a power source signal based on the electromagnetic inductive coupling scheme. Moreover, the first antenna 210 may include two or more repeater coils having different winding directions so as to be in parallel with the surface of the charge coil.

The portable device 200 distant from the charger 100 may use the second antenna 220. The second antenna 220 receives the power source signal through a magnetic resonance scheme. Herein, the magnetic resonance scheme is one that receives an electromagnetic-wave power source signal, which resonates in a specific frequency band, through an antenna which resonates over the same frequency and charges a battery. As an example, the second antenna 220 includes a loop coil for receiving a power source signal based on the magnetic resonance scheme.

In an embodiment of the present invention, the portable device 200 may receive the power source signal from the charger 100 through an antenna, and thus may receive a signal in a noncontact point scheme. Also, the portable device 200 may charge the battery regardless of a separated distance from the charger 100 by using a suitable antenna based on a distance separated from the charger 100.

Figure 2:
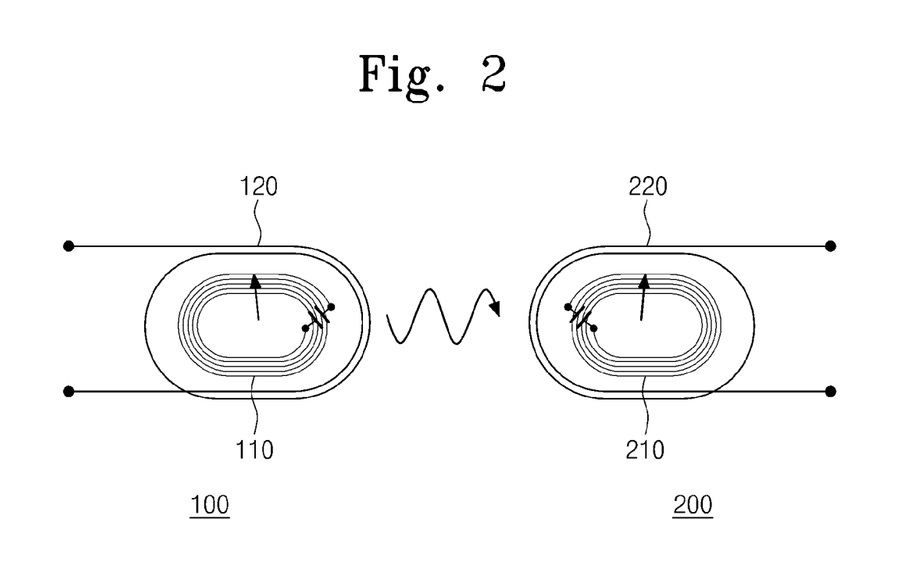
FIG. 2 is a diagram illustrating the charge coils of a charger and the antennas of a portable device which are illustrated in FIG. 1.

FIG. 2 is a diagram illustrating the charge coils of the charger and the antennas of the portable device which are illustrated in FIG. 1.

Referring to FIG. 2, the charger 100 includes charge coils 110 and 120, and the portable device 200 includes the antennas 210 and 220.

The first charge coil 110 generates a power source signal based on an electromagnetic inductive coupling scheme.

The first antenna 210 is inductive coupled to the first charge coil 110. Herein, inductive coupling moves a power source signal (i.e., electric energy) from the first charge coil 110 to the first antenna 210 through a magnetic field. The first antenna 210 receives a power source signal that is generated by the first charge coil 110. The first antenna 210 may include a repeater coil having a winding type. Only when the first antenna 210 includes a repeater coil having a winding direction parallel to the surface of the first charge coil 110, a power source can be efficiently transmitted. The power source signal received through the first antenna 210 has an induction frequency. As an example, the induction frequency includes a frequency having a band of about 100 to 300 KHz.

The first antenna 210 and the first charge coil 110 based on the electromagnetic inductive coupling scheme are adjacent to each other for inductive coupling. Accordingly, the first charge coil 110 and the first antenna 210 have excellent power source transmission efficiency in a near distance.

Moreover, the first antenna 210 may include at least two repeater coils. The respective repeater coils of the first antenna 210 may have a winding direction with respect to one of the X, Y and Z planes. Accordingly, the repeater coils of the first antenna 210 have a structure where they are perpendicularly crossed.

The second charge coil 120 generates a power source signal based on the magnetic resonance scheme.

The second antenna 220 resonates over a resonance frequency that is generated by the second charge coil 120. The second antenna 220 may include a loop coil that resonates over a predetermined resonance frequency. As an example, a resonance frequency includes a frequency of an Industrial, Scientific and Medical (ISM) frequency band. For example, the resonance frequency includes an ISM frequency band of about 2.15 MHz (2.1~2.2 MHz), 13.56 MHz (13~14 MHz), 900 MHz (902-928 MHz), about 2.4 GHz (2.4-2.497 GHz) or about 5.7 GHz (5.15-5.825 GHz).

The second antenna 220 and the second charge coil 120 based on the magnetic resonance scheme may transmit a power source signal from a long distance compared to the first charge coil 110 and the first antenna 210. Also, the second charge coil 120 and the second antenna 220 may solve a distance limit in the first antenna 210 and the first charge coil 110 using the electromagnetic inductive coupling scheme.

The second antenna 220 may transmits/receives a data signal to/from the second charge coil 120. For this, the second charge coil 120 may be configured with a loop coil and have the antenna function of the charger 100.

The first and second antennas 210 and 220 may be implemented as an antenna built into the portable device 200, i.e., an intenna type. Moreover, when a loop antenna is used as the second antenna 220 and a repeater coil is used as the first antenna 210, the repeater coil may be disposed inside the loop coil.

In an embodiment of the present invention, therefore, by transmitting/receiving a power source signal through at least two schemes, the battery of the portable device 200 may be charged irrespective of a separated distance between the charger 100 and the portable device 200.

Figure 3:
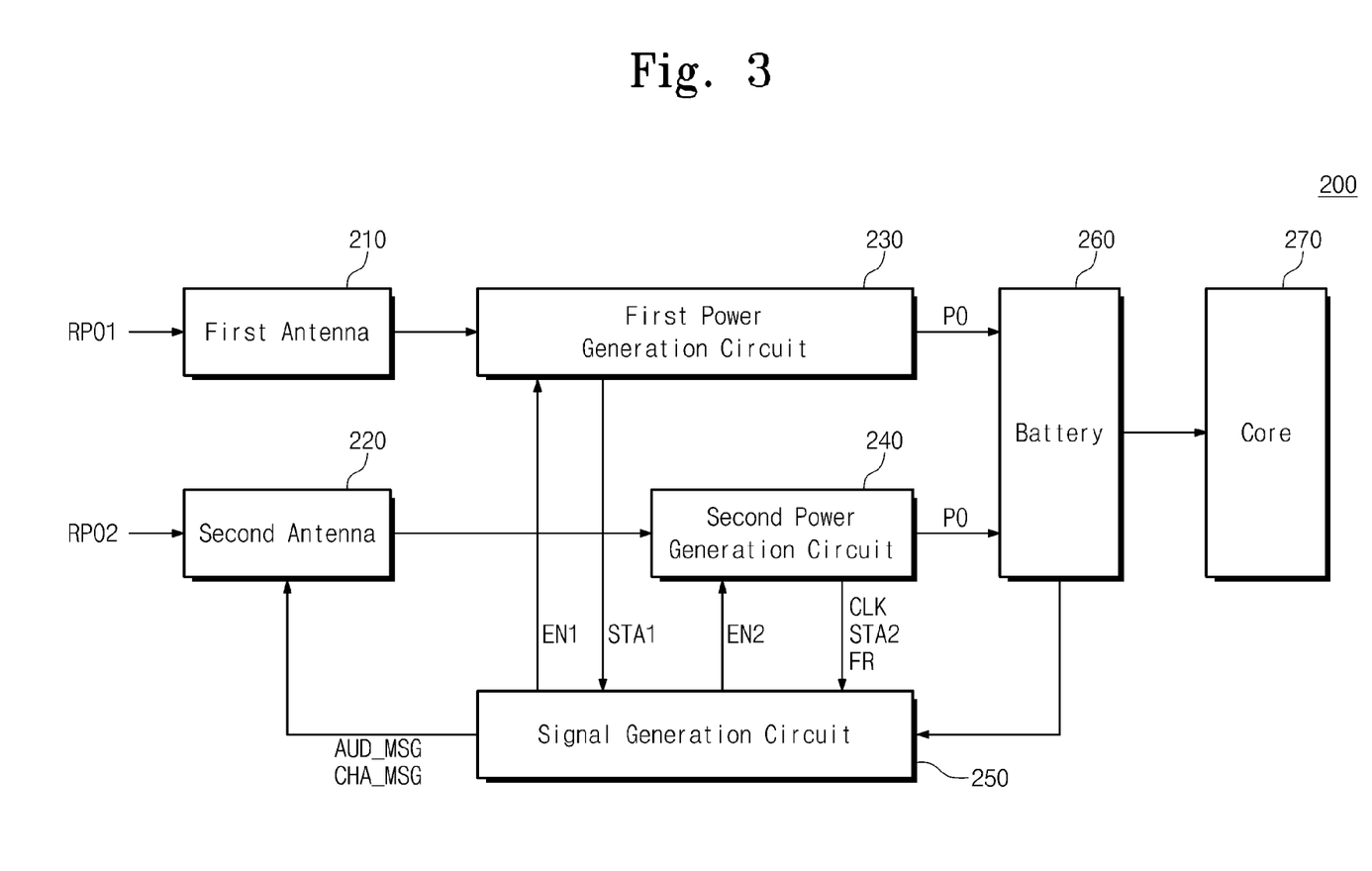
FIG. 3 is a block diagram illustrating a structure of the portable device which is exemplarily illustrated in FIG. 1.

FIG. 3 is a block diagram illustrating a structure of the portable device which is exemplarily illustrated in FIG. 1.

Referring to FIG. 3, the portable device 200 includes the first antenna 210, the second antenna 220, a first power generation circuit 230, a second power generation circuit 240, a signal generation circuit 250, a battery 260, and a core 270.

The first antenna 210 receives a first power source signal RPO1 from the charger 100 through the electromagnetic inductive coupling scheme. The first antenna 210 includes at least one repeater coil. Herein, when the first antenna 210 includes at least two repeater coils, the repeater coils included in the first antenna 210 have a structure where they are perpendicularly crossed.

The second antenna 220 receives a second power source signal RPO2 from the charger 100 through the magnetic resonance scheme. The second antenna 220 includes a loop coil. Herein, the loop coil resonates over the resonance frequency of the power source signal of the charger 100. Also, the second antenna 220 may transmit/receive a data signal to/from the portable device 200.

The first power generation circuit 230 receives a first battery state signal STA1 for controlling the charged state of the battery 260 from the received first power source signal RPO1. Herein, the received first power source signal RPO1 is an Alternating Current (AC) signal. The first power generation circuit 230 provides the first battery state signal STA1 to the signal generation circuit 250.

The first power generation circuit 230 changes the AC power source signal RPO1, which is received from the first antenna 210, into a Direct Current (DC) power source PO. The first power generation circuit 230 provides the power source PO to the battery 260 in response to a first charge enable signal EN1 that is provided from the signal generation circuit 250.

The second power generation circuit 240 generates a clock signal CLK and a frequency signal FR for transmitting control signals for charge from the received second power source signal RPO2, and generates a second battery state signal STA2 for controlling a battery charge state. Herein, the received power source signal RPO2 is an AC signal. The second power generation circuit 240 provides the frequency signal FR, the second battery state signal STA2 and the clock signal CLK to the signal generation circuit 250. The second power generation circuit 240 changes the AC power source signal RPO2, which is received from the second antenna 220, into a DC power source PO. The second power generation circuit 240 provides the power source PO to the battery 260 in response to a second charge enable signal EN2 that is provided from the signal generation circuit 250.

The signal generation circuit 250 generates the first charge enable signal EN1 in response to the first battery state signal STA1, or generates the second charge enable signal EN2 in response to the second battery state signal STA2. The signal generation circuit 250 checks the charged state of the battery 260 with the first charge enable signal EN1. When the charge of the battery 260 is not completed, the signal generation circuit 250 generates the first charge enable signal EN1. The signal generation circuit 250 checks the charged state of the battery 260 with the second charge enable signal EN2. When the charge of the battery 260 is not completed, the signal generation circuit 250 generates the second charge enable signal EN2.

The signal generation circuit 250 generates an authentication message AUD_MSG or a charge-requesting message CHA_MSG for receiving the first power source signal RPO1 or the second power source signal RPO2 from the charger 100. The signal generation circuit 250 may transmit the authentication message AUD_MSG or the charge-requesting message CHA_MSG through the second antenna 220. The authentication message AUD_MSG is one that is transmitted for authenticating the battery charge of the portable device 200 from the charger 100, and the charge-requesting message CHA_MSG is one that requests the transmission of a power source signal for battery charge.

The battery 260 includes power source cells, and stores the power source PO, which is provided from the first power source generation circuit 230 or the second power source generation circuit 240, in each of the power source cells. That is, the battery 260 is charged with the power source PO that is provided from the first power generation circuit 230.

The core 270 may include desired modules based on the kinds or functions of portable devices. The core 270 operates by a power source that is provided from the battery 260.

Figure 4:
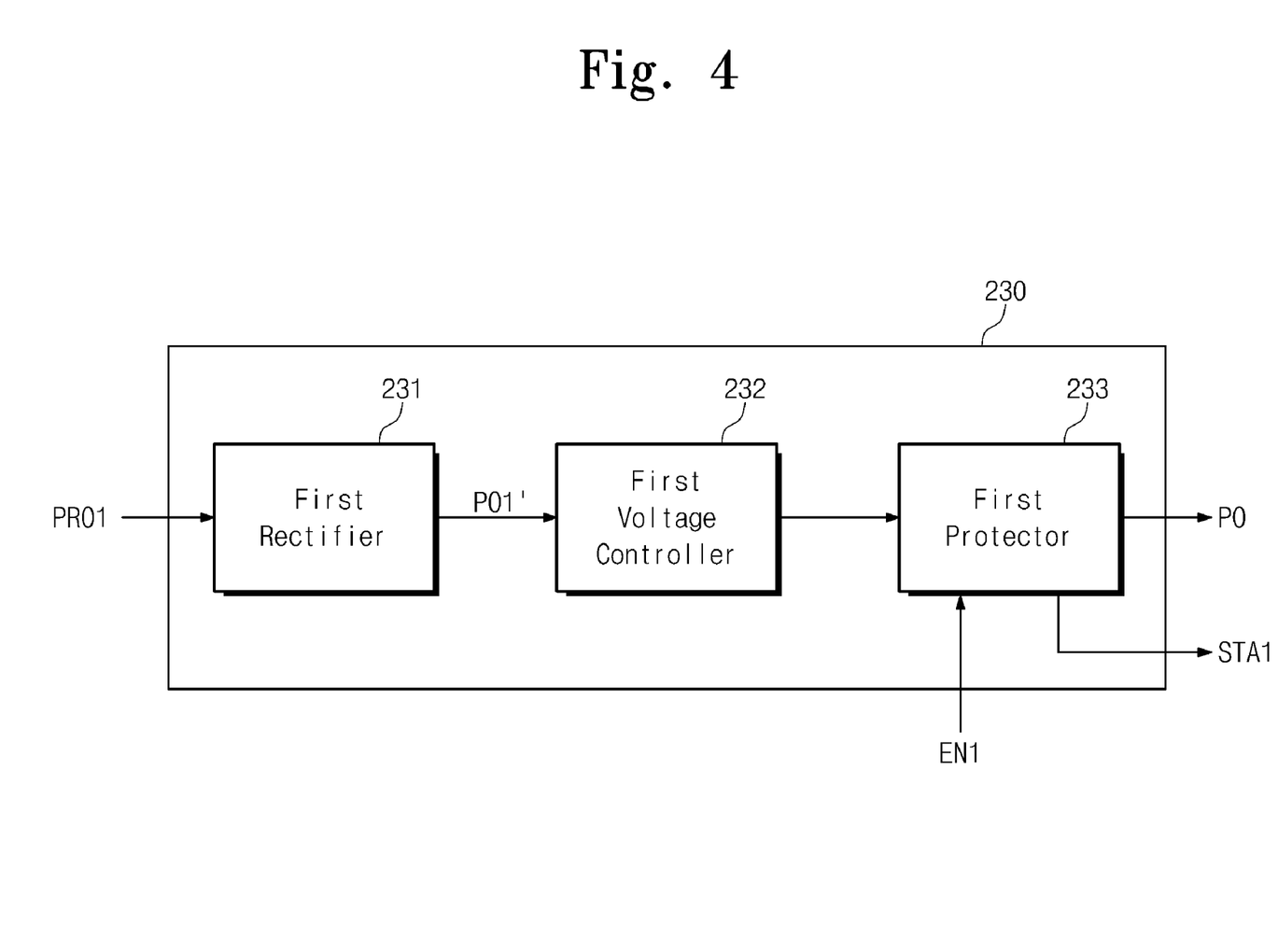
FIG. 4 is a block diagram exemplarily illustrating a structure of a first power generation circuit in FIG. 3.

FIG. 4 is a block diagram exemplarily illustrating a structure of the first power generation circuit in FIG. 3.

Referring to FIG. 4, the first power generation circuit 230 includes a rectifier 231, a voltage controller 232, and a protector 233.

The rectifier 231 changes the first power source signal RPO1 received into a first DC power source PO1'. The rectifier 231 may be a synchronous rectifier.

The voltage controller 232 decreases a ripple included in the rectified first power source PO1' and outputs the power source.

The protector 233 is one for controlling the overload of the battery 260. The protector 233 detects the charged state of the battery 260 and generates the first charge state signal STA1 according to the detection of the charged state. The protector 233 receives the first charge enable signal EN1 in response to the first charge state signal STA1. The protector 233 provides a power source PO, from which a ripple is reduced, to the battery 260 in response to the first charge enable signal EN1.

Figure 5:
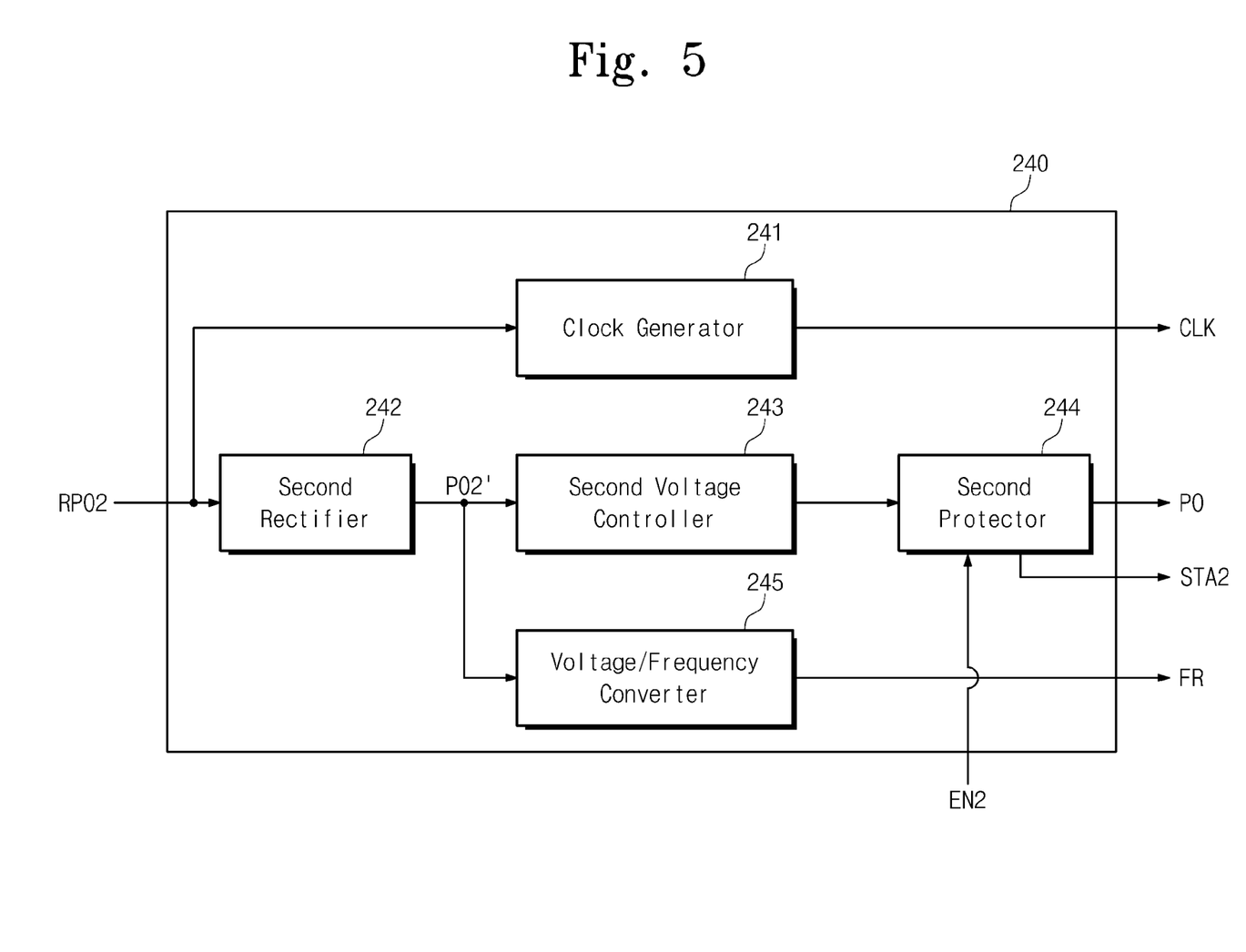
FIG. 5 is a block diagram exemplarily illustrating a structure of a second power generation circuit in FIG. 3.

FIG. 5 is a block diagram exemplarily illustrating a structure of the second power generation circuit in FIG. 3.

Referring to FIG. 5, the second power generation circuit 240 includes a clock generator 241, a second rectifier 242, a second voltage controller 244, a second protector 244, and a voltage/frequency converter 245.

The clock generator 241 generates a clock signal CLK for synchronization between the portable device 200 and the charger from the second power source signal RPO2 received. Herein, the clock generator 241 may be included in the first power generation circuit 230.

The second rectifier 242 changes the second power source signal RPO2 received into a second DC power source PO2'. The second rectifier 242 may be a synchronous rectifier.

The second voltage controller 243 decreases a ripple included in the rectified second power source PO2' and outputs the power source.

The second protector 244 is one for controlling the overload of the battery 260. The second protector 244 detects the charged state of the battery 260 and generates the second charge state signal STA2 according to the detection of the charged state. The second protector 244 receives the second charge enable signal EN2 in response to the second charge state signal STA2. The second protector 244 provides a power source PO, from which a ripple is reduced, to the battery 260 in response to the second charge enable signal EN2.

The voltage/frequency converter 245 performs voltage-to-frequency conversion to generate the frequency signal FR from the power source signal received.

Figure 6:
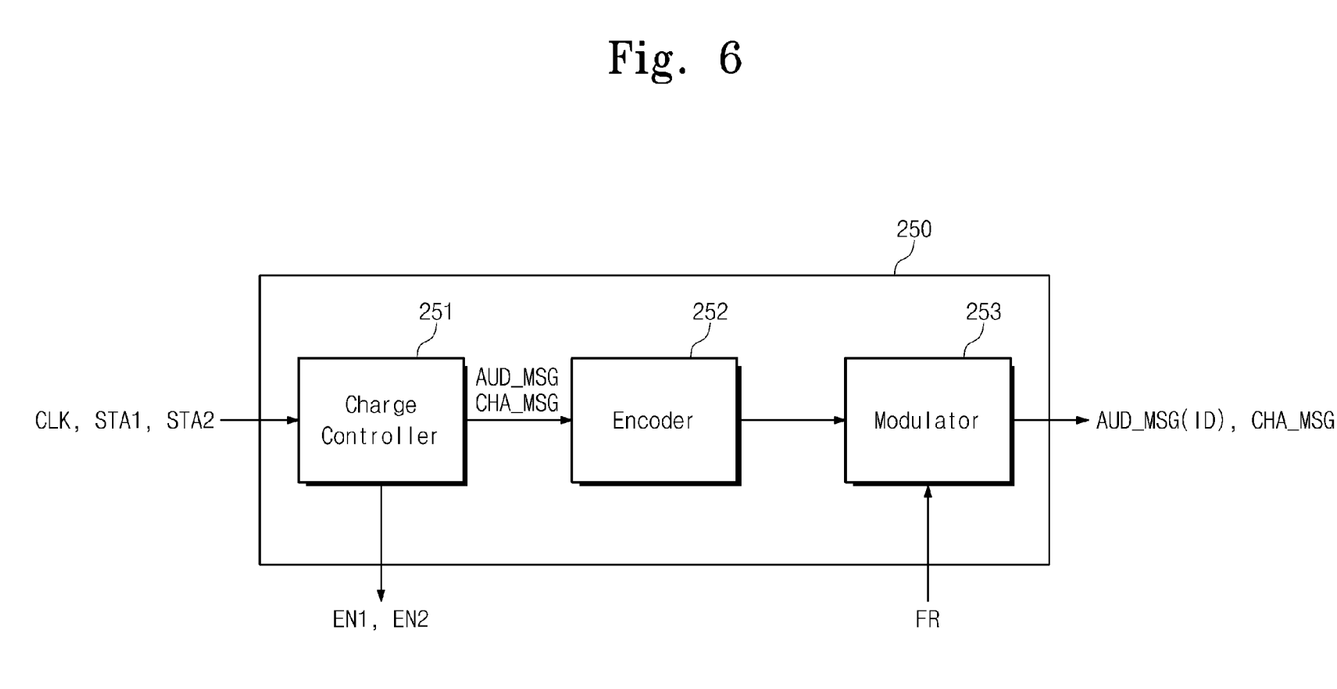
FIG. 6 is a block diagram exemplarily illustrating a signal generation circuit of FIG. 3.

FIG. 6 is a block diagram exemplarily illustrating the signal generation circuit of FIG. 3.

Referring to FIG. 6, the signal generation circuit 250 includes a charge controller 251, an encoder 252, and a modulator 253.

The charge controller 251 generates the authentication message AUD_MSG for authenticating portable devices that may receive a power source from the charger 100. The authentication message AUD_MSG includes the identification (ID) (for example, a Medium Access Control (MAC) address of the portable device 200.

When the charging operation of the portable device 200 is started through authentication with the charger 100, the charge controller 251 receives the first charge state signal STA1 or the second charge state signal STA2. The charge controller 251 may receive the second charge state signal STA2. The charge controller 251 checks the current charged state of the battery 260 through the first charge state signal STA1 or the second charge state signal STA2. The charge controller 251 generates the first charge enable signal EN1 for battery charge in response to the first charge state signal STA1, or generates the second charge enable signal EN2 for battery charge in response to the second charge state signal STA2. The charge controller 251 outputs the first charge enable signal EN1 to the first protector 233 or outputs the second charge enable signal EN2 to the second protector 244. The charge controller 251 controls the supply or shutoff of the power source that is provided from the battery 260.

When the charge of the battery 260 is required according to the first charge state signal STA1 or the second charge state signal STA2, the charge controller 251 generates the charge-requesting message CHA_MSG to be transmitted to the charger 100. The charge controller 251 may request the supply of a power source signal from the charger 100 through the charge-requesting message CHA_MSG.

The charge controller 251 may generate the authentication message AUD_MSG or the charge-requesting message CHA_MSG, for example, in a packet data type that includes a preamble region, a unique recognition code region and a data region.

The encoder 252 encodes a message (for example, the authentication message AUD_MSG and the charge-requesting message CHA_MSG) which is generated by the charge controller 251 in a predetermined encoding scheme.

The modulator 253 modulates the message into a frequency signal for the transmission of the encoded message. The modulator 253 receives the frequency signal FR that is detected from the power source signal PO for modulation and modulates the encoded message according to the frequency signal FR. The modulator 253, for example, may use an Amplitude Shift Keying (ASK) modulation scheme. The modulator 253 transmits the modulated message signal to the charger 100 through the second antenna 220.

Figure 7:
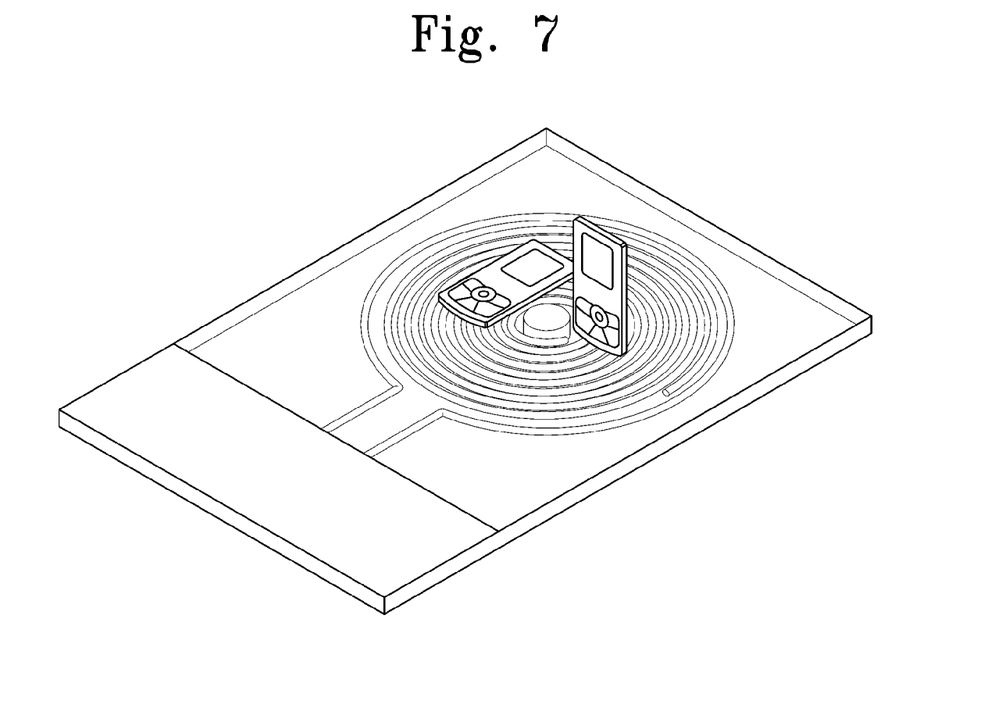
FIG. 7 is a diagram schematically illustrating an operation which receives a power source signal from the portable device of FIG. 1 in an electromagnetic inductive coupling scheme.

FIG. 7 is a diagram schematically illustrating an operation which receives a power source signal from the portable device of FIG. 1 in the electromagnetic inductive coupling scheme.

Referring to FIG. 7, the portable device 200 includes repeater coils parallel to the surface of the charge coil of the charger 100 for receiving a power source signal in the electromagnetic inductive coupling scheme.

The first antenna 210 of the portable device 200, for example, includes a plurality of repeater coils to be in parallel to the surface of the charge coil. That is, the first antenna 210 includes a plurality of repeater coils parallel to the winding surface of the charge coil. Accordingly, the reception performance of a power source based on the electromagnetic inductive coupling scheme is not degraded irrespective of the position of the portable device 200 on the charge coil.

Figure 8:
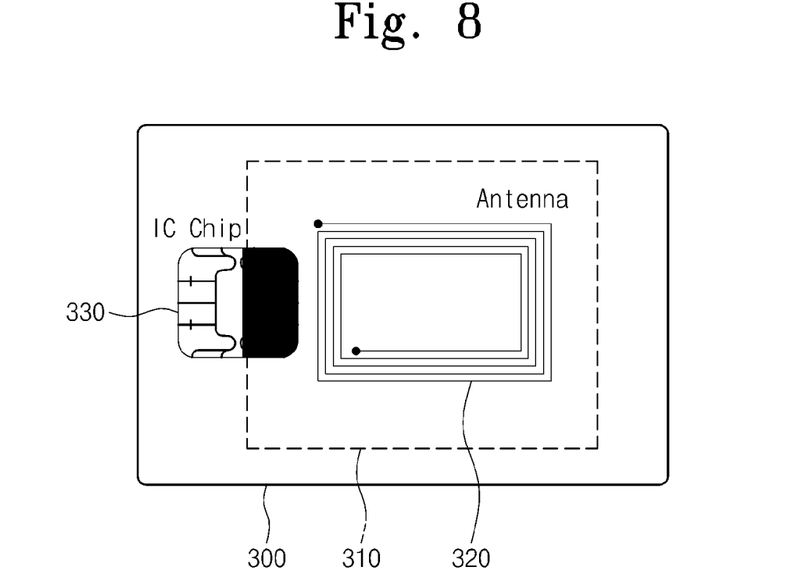
FIG. 8 is a diagram illustrating a structure of an antenna for receiving power source signals according to another embodiment of the present invention.

FIG. 8 is a diagram illustrating a structure of an antenna for receiving power source signals according to another embodiment of the present invention.

Referring to FIG. 8, a smart card 300 includes a first antenna 310, a second antenna 320, and an Integrated Circuit (IC) chip 330.

The smart card 300 may be inserted into portable devices. The portable devices may not include discrete antennas for receiving a power source signal. In this case, the smart card 300 including the first and second antennas 310 and 320 may be mounted on the portable device and used.

The first antenna 310 is one for receiving a power source signal from a near distance. The first antenna 310 receives the power source signal in the electromagnetic inductive coupling scheme. Herein, the first antenna 310 includes a repeater coil.

The second antenna 320 is one for receiving a power source signal from a long distance. The second antenna 320 receives the power source signal in the magnetic resonance scheme. Herein, the second antenna 320 includes a loop coil.

In FIG. 8, a smart card inserted into portable devices includes antennas (for example, the first antenna 310 for near field communication and the second antenna 320 for telecommunication) according to embodiments of the present invention. However, the antennas according to embodiments of the present invention may be applied to memory cards such as Security Digital (SD) cards, Compact Flash (CF) cards and micro SD (T-flash) cards that may be inserted into portable devices.

Antenna structures according to embodiments of the present invention may be applied to smart cards or memory cards. Therefore, even in the case of a portable device that cannot include an antenna due to structural characteristic, a battery may be charged through a corresponding antenna by inserting a smart card or a memory card.

Portable devices using antennas according to embodiments of the present invention, for example, include portable phones, smart phones, PDAs, PMPs, DAPs, notebook computers, net book computers, camcorders and e-books.

The first and second antennas of the portable device according to embodiments of the present invention receive a power source signal from a charger according to the position of the portable device. The portable device according to embodiments of the present invention charges a battery with a power source signal. That is, in embodiments of the present invention, the battery of the portable device is charged with the power source signal in the noncontact point scheme. For this, the portable device may use the electromagnetic inductive coupling scheme and the magnetic resonance scheme for power charge.

In the portable device, moreover, the antenna is configured with coils having a winding direction parallel to the surface of the portable device when charging the battery in the electromagnetic inductive coupling scheme, and thus charge performance can be enhanced.

A portable device near to a charger performs communication in the electromagnetic inductive coupling scheme. A portable device distant from the charger performs communication in the magnetic resonance scheme. As an example, the charger and the portable device may use a frequency of about 100 to 500 KHz band as an induction frequency, and a resonance frequency may use a frequency of an ISM band of about 2.15 MHz (2.1-2.2 MHz), 13.56 MHz (13-14 MHz), 900 MHz (902-928 MHz), about 2.4 GHz (2.4-2.497 GHz) or about 5.7 GHz (5.15-5.825 GHz).

The charger and the portable device may use a frequency of an ISM band as the induction frequency. However, the induction frequency uses an ISM frequency having a band different from that of the resonance frequency.

Accordingly, a portable device may be disposed at a position near to or distant from a charger for charge. Moreover, battery charging schemes based on the distance of the portable device use different frequency bands therebetween, and separately include a power generation circuit. Accordingly, the portable device may charge a battery by selectively using first and second antennas according to its position, or may charge the battery by using all the first and second antennas.

The portable device according to embodiments of the present invention charges the battery with the charger in a noncontact point scheme. Also, the portable device according to embodiments of the present invention charges the battery through the antenna irrespective of a distance separated from the charger.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A portable device, comprising:
 a near distance antenna receiving a first power source signal in an electromagnetic inductive coupling scheme;
 a long distance antenna receiving a second power source signal in a magnetic resonance scheme;
 a first power generation circuit generating a power source from the first power source signal, including a first voltage controller that removes a ripple in the power source, and a first protector generating a first charge state control signal;
 a second power generation circuit generating a power source from the second power source signal; and
 a battery charged with the generated power source, wherein the first charge state control signal represents a charged state of the battery, and wherein the first protector provides the power source, from which the ripple is removed, to the battery in response to a first charge enable signal.

2. The portable device of claim 1, wherein the near distance antenna and the long distance antenna are internal antennas, respectively.

3. The portable device of claim 1, wherein the near distance antenna comprises a first repeater coil having a winding direction parallel to a surface of the portable device.

4. The portable device of claim 3, wherein the near distance antenna further comprises a second repeater coil which is perpendicularly crossed with the first repeater coil.

5. The portable device of claim 1, wherein the long distance antenna comprises a loop antenna.

6. The portable device of claim 1, wherein the first and second power source signals use frequencies having different bands, respectively.

7. The portable device of claim 1, wherein the first power generation circuit comprises a first rectifier changing the first power source signal into an Alternating Current (AC) power source.

8. The portable device of claim 7, wherein the second power generation circuit comprises:
 a clock generator generating a clock signal from the second power source signal;
 a second rectifier changing the second power source signal into a Direct Current (DC) power source;
 a second voltage controller removing a ripple which is comprised in the power source;
 a second protector generating a second charge state control signal which represents a charged state of the battery, and providing the power source, from which the ripple is removed, to the battery in response to a second charge enable signal; and a voltage/frequency converter generating a frequency signal from the power source signal.

9. The portable device of claim 8, further comprising a signal generating circuit generating the first charge enable signal on the basis of the first charge state signal, and generating the second charge enable signal on the basis of the second charge state signal.

10. The portable device of claim 9, wherein the signal generation circuit comprises:
 a charge controller generating the first charge enable signal and the second charge enable signal, receiving the clock signal, and generating an authentication message for obtaining authentication of the portable device from the charger;

an encoder encoding the authentication message; and a modulator modulating the encoded authentication message to be in correspondence with the frequency signal, and transmitting the modulated message through the long distance antenna.

11. The portable device of claim 10, wherein the authentication message comprises identification (ID) information of the portable device.

12. A battery charging method of portable device, the battery charging method comprising:

receiving a power source signal through at least one antenna of a near distance antenna and a long distance antenna according to a separated distance from a charger;

changing the power source signal into an Alternating Current (AC) power source;

removing a ripple of the AC-converted power source; and providing the power source, from which the ripple is removed, to a battery based on a charged state of the battery, wherein the near distance antenna uses an electromagnetic inductive coupling scheme, and the long distance antenna uses a magnetic resonance scheme.

13. The battery charging method of claim 12, wherein the receiving of a power source signal receives a power source signal through the near distance antenna which comprises at least one or more repeater coils having a winding direction parallel to a surface of the portable device.

14. The battery charging method of claim 13, wherein a first repeater coil of the repeater coils is perpendicularly crossed with a second repeater coil of the repeater coils.

15. The battery charging method of claim 12, wherein the receiving of a power source signal receives a power source signal through the long distance antenna which comprises a loop coil.

16. The battery charging method of claim 12, further comprising transmitting an authentication message for authentication of the portable device.

17. The battery charging method of claim 16, wherein the authentication message is modulated into a frequency which is obtained from the second power source signal and transmitted.

18. The battery charging method of claim 12, further comprising transmitting a charge-requesting message for requesting supply of at least one of the first and second power source signals to the charger, based on a charged state of the battery.

19. The battery charging method of claim 18, wherein the charge-requesting message is modulated into a frequency which is obtained from the second power source signal and transmitted.

* * * * *